May 8, 1962 A. E. MULLET 3,032,956
MOBILE WEED AND BRUSH CUTTING MACHINE
Filed July 5, 1960 3 Sheets-Sheet 1
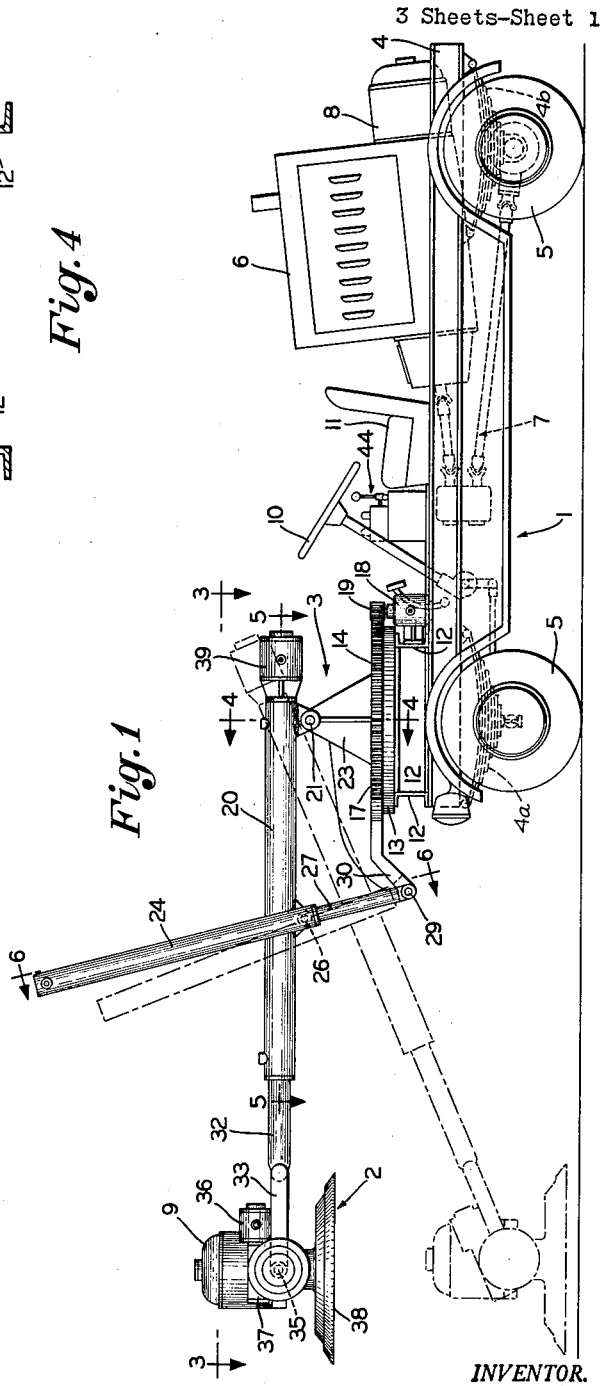
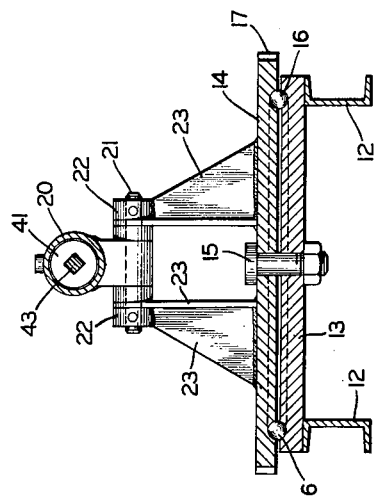
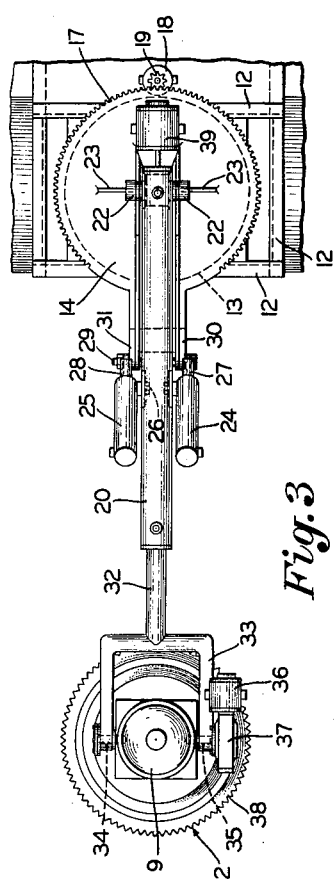
INVENTOR.
*Atlee E. Mullet*
BY
*Frease, Bishop, Johns & Schick*
ATTORNEYS May 8, 1962 A. E. MULLET 3,032,956
MOBILE WEED AND BRUSH CUTTING MACHINE
Filed July 5, 1960 3 Sheets-Sheet 2

INVENTOR.
Atlee E. Mullet
BY
Frease, Bishop, Johns & Schick
ATTORNEYS

May 8, 1962

A. E. MULLET 3,032,956

MOBILE WEED AND BRUSH CUTTING MACHINE

Filed July 5, 1960

INVENTOR.
*Atlee E. Mullet*

BY
*Frease, Bishop, Johns & Schick*

ATTORNEYS

United States Patent Office 3,032,956
Patented May 8, 1962

3,032,956
MOBILE WEED AND BRUSH CUTTING MACHINE
Atlee E. Mullet, Rte. 5, Millersburg, Ohio
Filed July 5, 1960, Ser. No. 40,750
1 Claim. (Cl. 56—25.4)

This invention relates to mobile mowing devices. More particularly, it pertains to improvements in mechanical machines for cutting foliage.

Mechanical mowing machines of prior construction for cutting grass and weeds and for trimming bushes and trees along a highway have been inadequate for various reasons. Many of the prior machines have been mounted upon conventional truck beds which are designed primarily for another purpose and, therefore, are not specifically adapted for use as mowing apparatus. The combination of a mowing device on a truck bed is usually too bulky and not easily maneuverable, for which reason foliage grows uncontrolled in an unsightly manner.

Moreover, where mowing machines are mounted on truck beds two men are usually required for operating the machine, one man for driving the truck and another for operating the mowing device. In addition, the operator of the mowing device does not have the advantage of a clear, uninhibited view far enough ahead of his cutter to operate at maximum efficiency.

Finally, prior mobile mowing machines having hydraulically operated booms have been limited in maneuverability by the lack of means for rotating the boom about its longitudinal axis. As a result, it has not always been easy for an operator to place the cutting head in a particular location and at a specific angle as the need requires, whereby a less effective trimming and cutting head has been available.

It has also been found that mowing devices of prior construction have been limited by their basic construction, for which reason they have not been readily maneuverable to operate over varying terrains as well as around and/or over objects of various kinds which are disposed at frequent intervals along a road or highway. That aspect together with the co-ordination of the operator with respect to the cutter have not provided a mowing machine completely adapted for use along a highway.

Accordingly, it is a general object of this invention to provide a mobile weed and brush cutting machine which is constructed so that a single operator is positioned at the forward end of the machine where he can readily manipulate the cutter into various positions and around or over objects adjacent a highway.

It is another object of this invention to provide a mobile weed and brush cutting machine which is composed of a minimum number of parts, which parts are hydraulically or electrically operated for maximum efficiency.

It is another object of this invention to provide a mobile weed or brush cutting machine having an extension boom which can rotate 360° about its axis and thereby permit cutting of foliage either on the ground or above the ground, such as trees.

Finally, it is an object of this invention to provide an improved mobile weed and brush cutting machine which accomplishes the foregoing objects and desiderata in a simple and effective manner.

These and other objects and advantages apparent to those skilled in the art from the following description and claim may be obtained, the stated results achieved, and the described difficulties overcome by the discoveries, principles, apparatus, parts, elements, combinations, and subcombinations which comprise the present invention, the nature of which is set forth in the following general statement, a preferred embodiment of which—illustrative of the best mode in which applicant has contemplated applying the principles—is set forth in the following description and shown in the drawings, and which is particularly and distinctly pointed out and set forth in the appended claim forming part hereof.

Generally, the improved mobile weed and brush cutting construction of the present invention includes a mobile carrier having a rearwardly mounted prime mover and a turntable rotatably mounted on a vertical axis, a boom pivotally mounted on a turntable on an axis transverse to that of the turntable, a pair of hydraulic lifts extending between the turntable and the boom for raising or lowering the boom about its axis of rotation, a piston in the boom having an elongated piston rod extending outwardly therefrom and telescopically of the boom, the piston having an aperture therethrough, an elongated shaft extending through the axis of the boom and through the aperture in the piston, the aperture and the shaft having corresponding cross sections other than round, a cutter head mounted on the outer extremity of the piston rod and rotatable thereon at an angle to the axis of the piston rod, hydraulic means for rotating the turntable, the boom, the shaft and the cutter head, a driver's station disposed on the carrier between the prime mover and the turntable, and hydraulic control means adjacent the driver's station for operating the cutter unit.

The preferred embodiment of the invention is illustrated by way of example in the accompanying drawings, in which:

FIGURE 1 is a side elevational view of a mobile weed and brush cutting machine, showing the cutter head and boom in an alternate position in broken line;

FIG. 3 is a plan view of the cutter head, boom and turntable, taken on the line 3—3 of FIG. 1;

FIG. 4 is an enlarged sectional view of the turntable, taken on the line 4—4 of FIG. 1;

Similar numerals refer to similar parts throughout the several views of the drawings.

Figure 2:
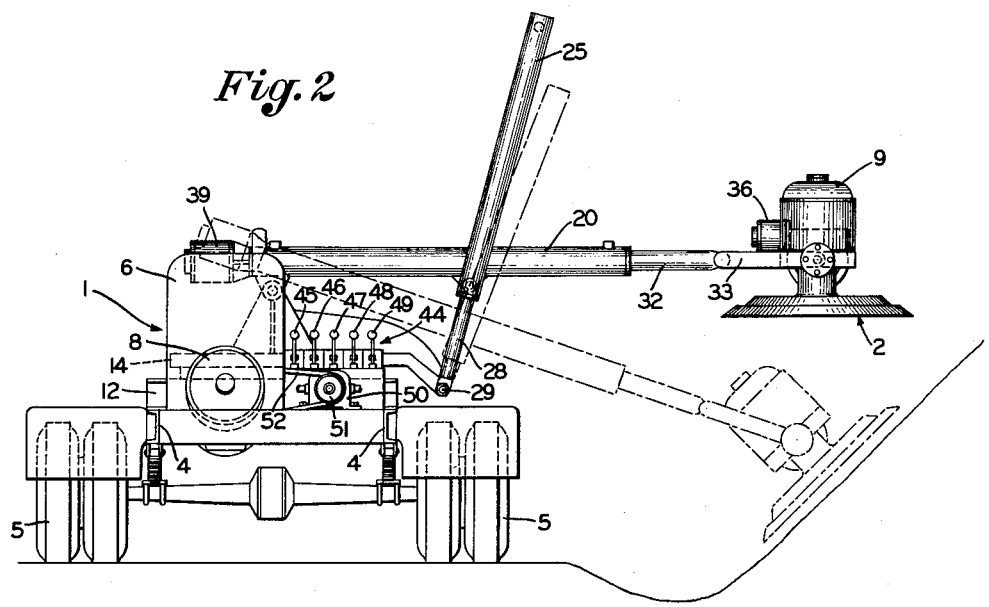
FIG. 2 is a rear view of the machine, showing the cutter head and boom in other alternate positions.

In FIG. 1 a mobile machine for cutting grass and weeds and for trimming brush and trees is shown and includes a carrier generally indicated at 1, a cutter head 2, and hydraulic means 3 for maneuvering the cutter head. The carrier 1 includes a pair of longitudinal channels 4 which are preferably mounted on springs 4a and 4b at front and rear wheels 5 in a conventional manner.

The carrier includes a prime mover 6, which is preferably a gasoline engine, connected by drive means 7 to the rear wheels 5. The prime mover includes an electric generator 8 for the purpose of providing current for a motor 9 which operates the cutter head 2.

A steering wheel 10 and an operator's seat 11 are provided between the motor 6 and the hydraulic means 3 for supporting the cutter head 2. In this manner the mowing machine may be operated by a single operator who not only maneuvers the carrier 1 but also operates the cutter head 2 which he preferably disposes in a position ahead of the driver's seat where he can observe not only the road ahead but also the terrain over which the cutter head 2 is moving.

The hydraulic means 3 for supporting the cutter head 2 is mounted on the carrier 1 at the forward end, preferably over the front wheels 5, and is secured in place on the channel members 4 on additional members 12, as shown in FIGS. 3 and 4. A base plate 13 is secured above the channel members 12, preferably by means of welds, not shown. A turnable 14 is rotatably mounted on the base plate 13 on a centrally disposed pivot pin 15, as well as on bearings 16 situated at the outer peripheral portions of the base plate and turntable. The turntable 14 is also provided with a plurality of gear teeth which form a peripheral rack 17 (FIG. 3) which extends entirely around the turntable except for an arcuate portion at the forward end thereof. As shown in FIGS. 1 and 3, the turntable 14 is rotated by a reversible hydraulic motor 18 which operates a pinion gear 19 which engages the rack 17.

Figure 6:
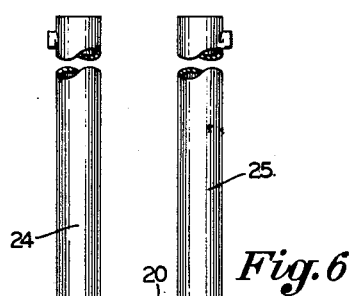
FIG. 6 is an enlarged, fragmentary vertical view of the hydraulic lift cylinders with part in section, taken on the line 6—6 of FIG. 1.

The hydraulic means 3 for supporting the cutter head 2 also includes a boom 20, the rear end portion of which is pivotally mounted for rotation about a horizontal axis on a pin 21 (FIG. 4) journally mounted at 22 at the top of a pair of similar spaced support brackets 23 secured on the turntable 14. The boom 20 is supported by a pair of hydraulic cylinders 24 and 25 for lifting and lowering the boom 20 to various angles about the pivot pin 21. As shown in FIG. 1, 3, and 6, the cylinders 24 and 25 are secured at their lower ends to the boom cylinder 20 on opposite sides thereof by similar pins 26.

Moreover, each cylinder 24 and 25 includes a piston rod 27 and 28, the lower ends of which are pivotally secured on a pivot pin 29 which is journaled in the outer extremities of a pair of spaced brackets 30 and 31 extending from one side of the turntable 14.

The outer end of the boom 20 is provided with a piston rod 32 having a yoke 33 at the outer end thereof. As shown in FIGS. 1 and 3, the assembly of the cutter head 2 and electric motor 9 are pivotally mounted within the yoke 33 on pins or trunnions 34 and 35. The pin 34 is preferably round in cross section and the pin 35 is preferably square so that it can be rotated to various angles with regard to the axis of the boom 20 by a hydraulic motor 36 through a worm gear assembly 37 of conventional construction, as indicated in the drawings. The cutter head 2 is detachably mounted on the shaft of the motor 9 and may be a circular member like a band saw having peripheral teeth 38 or of some other construction which is best adapted for cutting grass and bushes and trimming trees.

Figure 5:
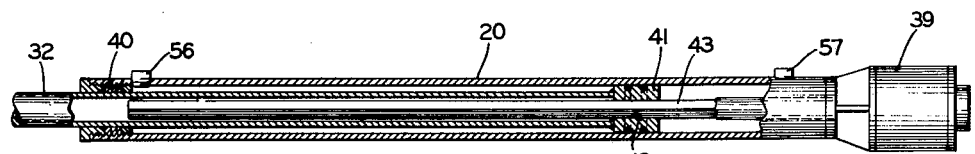
FIG. 5 is an enlarged horizontal sectional view, partly in elevation, of the boom, taken on the line 5—5 of FIG. 1.
Figure 7:
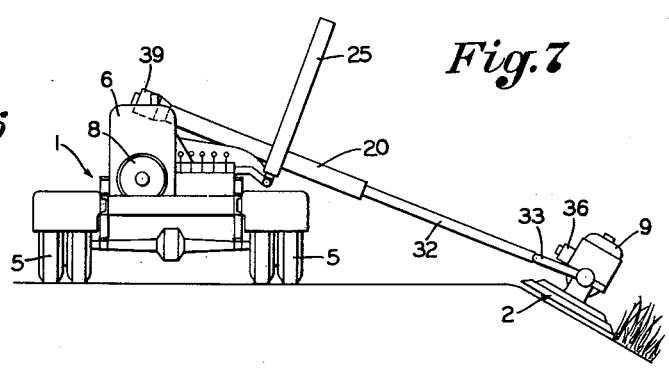
FIG. 7 is a rear view of the machine, showing the cutter head disposed in an inclined position with respect to the extended boom.

At the end of the boom 20 near the turntable 14, a hydraulic motor 39 is provided for rotating the piston rod 32 about the axis of the boom through a 360° angle. The manner in which the motor 39 rotates the rod 32 is shown in FIG. 5, in which the piston rod 32 is telescopically mounted within the boom 20 where it is sealed by packing means 40. The inner end of the piston rod 32 includes a piston head 41 which is provided with a bore 42 having a preferably square cross section to receive an elongated square shaft 43. In FIG. 5, the shaft 43 is substantially coextensive with the boom 20 so that the shaft is always connected to the piston rod 32, even when the boom and piston rod are at their fully extended positions as shown in FIG. 7. The shaft 43 is an extension of the shaft of the hydraulic motor 39.

Figure 8:
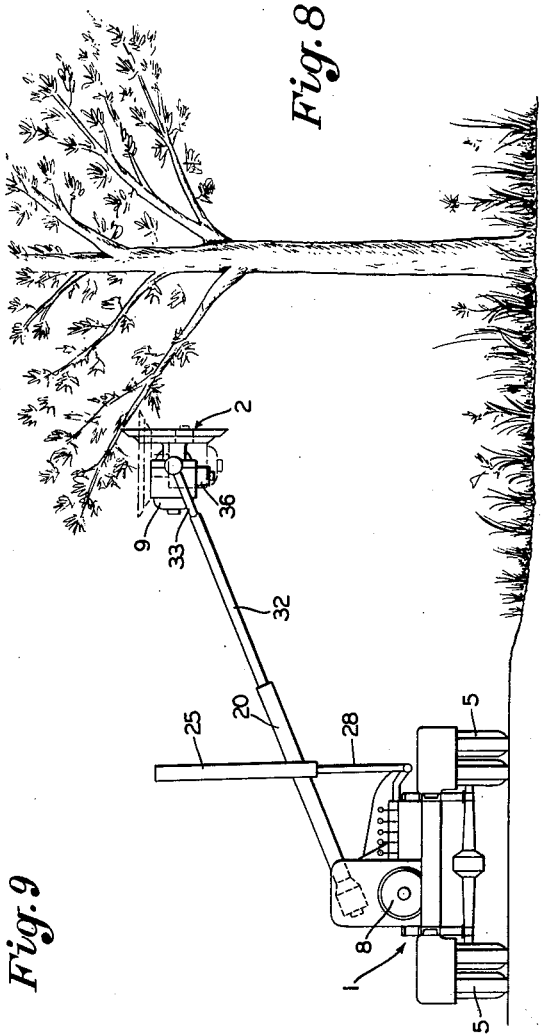
FIG. 8 is another rear view of the machine, showing the cutter head in alternate positions on an extended boom for trimming trees.

By providing the motor 39 with the shaft 43 of square cross section for rotating the piston rod 32 within the boom 20, the cutter head 2 may be turned into any plane to accommodate the various angles of terrain which the cutting head may encounter. Moreover, rotation of the piston rod 32 about the longitudinal axis of the boom greatly facilitates the operator's task of cutting or trimming branches from an overhead location such as a tree, as shown in FIG. 8. As a result of the longitudinal rotation of the piston rod 32, as well as the rotation of the cutter head about the transverse pins 34 and 35, the cutter head may be turned into any position for cutting or trimming foliage.

Figure 9:
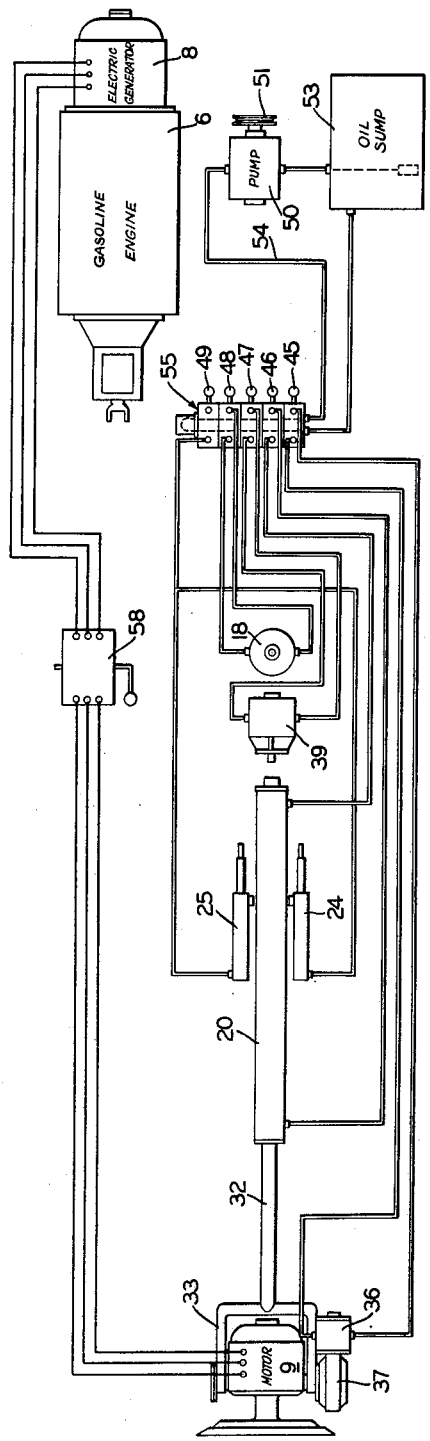
FIG. 9 is a diagrammatic view, showing the hydraulic and electrical layout.

As shown in FIGS. 1 and 2, a bank 44 of control levers 45–49 is provided on the right-hand side of the operator's seat 11 in close proximity to the operator. Each lever controls a different function in the hydraulic system which, as shown in FIG. 9, includes a pump 50 having a pulley 51 that is driven by a V-belt 52 (FIG. 2) by the prime mover or gasoline engine 6. The pump 50 operates in conjunction with a hydraulic oil sump 53 for pumping hydraulic fluid through a conduit 54 to the bank of hydraulic valves 55 which are individually actuated by the control levers 45–49. The valves actuated by the levers 45–48 are reversible to permit reversible operation of the corresponding hydraulic motors. Specifically, the lever 45 when moved in one direction actuates the tilt motor 36 to rotate the cutter head in either direction within the yoke 33. Likewise, the levers 47 and 48 may be used to reversely operate the boom motor 39 and the swing motor 18, respectively.

The lever 46 operates to extend or retract the piston rod 32 in the boom 20 by injecting hydraulic fluid into the boom cylinder on one or the other side of the piston 41 (FIG. 5) through ports 56 and 57. Finally, the lever 49 operates the hydraulic cylinders 24 and 25 simultaneously for raising the boom 20 to various angles, as desired.

As shown in FIG. 9, the generator 8 is connected through a switch 58 by which the electric motor 9 may be reversely operated.

The device of the present invention is an improvement over previous constructions because it provides an effective mobile unit for cutting foilage such as grass and other growth along a highway, as well as for trimming bushes and trees. The cutter head is mounted on an extendible boom and is rotatable about an axis transversely of the axis of the boom. Moreover, the cutter head is rotatable about the longitudinal axis of the boom, which in combination with rotation about the transverse axis permits placement of the cutting blade in practically any desired position.

In addition, the boom is mounted on a turntable, the vertical axis of which is situated ahead of the operator of the carrier so that the operator may not only observe the road ahead of him but also the cutter head's position as the carrier moves over a highway. Location of the turntable ahead of the operator also obviates the need of a second operator for operating the unit. In that manner the forward movement of the carrier, as well as the maneuverability of the cutter head can be co-ordinated through the efforts of a single operator and thereby accomplish the over-all job of trimming in a more effective and inexpensive manner.

In the foregoing description, certain terms have been used for brevity, clearness and understanding; but no unnecessary limitations are to be implied therefrom beyond the requirements of the prior art, because such terms are utilized for descriptive purposes herein and not for the purpose of limitation and are intended to be broadly construed.

Moreover, the description of the improvements is by way of example and the scope of the present invention is not limited to the exact details illustrated, or to the specific mechanisms shown.

Having now described the features, discoveries and principles of the invention, the construction, operation and use of the improved mechanisms and the advantageous, new and useful results obtained thereby; the new and useful parts, elements, constructions, mechanisms, combinations, subcombinations, and arrangements, and mechanical equivalents obvious to those skilled in the art, are set forth in the appended claim.

I claim:

A weed and brush cutting machine including a mobile carrier having an operator's station thereon, a turntable rotatably mounted on a vertical axis on the carrier, a boom pivotally mounted on a horizontal axis on the turntable, hydraulic means for rotating the turntable on the carrier, the boom including two telescopic portions of circular cross section, one portion being a boom cylinder pivotally mounted on the turntable for rotation about the horizontal axis in a vertical plane, the other portion being a first shaft telescopically mounted within the boom cylinder and being longitudinally and rotatably movable therein, hydraulic lift means extending between the turntable and the boom cylinder for raising and lowering the boom about its horizontal pivotal axis, the first shaft including an inner piston end portion operatively mounted within the cylinder, second hydraulic means operatively connected to the boom cylinder, the piston end portion having a rectangular aperture therethrough, an elongated shaft substantially coextensive with the boom cylinder, the elongated shaft having a rectangular cross section and extending through the aperture in said piston end portion, a hydraulic motor mounted on the outer end of the elongated shaft remote from the first shaft and operatively connected to the elongated shaft for rotating the first shaft, the outer end of the first shaft having a yoke, a second hydraulic motor pivotally mounted between the yoke portions on trunnions, a third hydraulic motor mounted on the yoke for rotating the second hydraulic motor on its trunnions, and a cutting head mounted on the shaft of the second hydraulic motor.

References Cited in the file of this patent
UNITED STATES PATENTS

| | | |
|---|---|---|
| 1,602,357 | Georgelis | Oct. 5, 1926 |
| 2,365,408 | Hillyer | Dec. 19, 1944 |
| 2,461,188 | Stoner | Feb. 8, 1949 |
| 2,648,940 | Merkely et al. | Aug. 18, 1953 |
| 2,833,422 | Ferwerda et al. | May 6, 1958 |